May 16, 1967 J. E. STEPHENS 3,319,992
GRABS
Filed Feb. 8, 1965 3 Sheets-Sheet 1
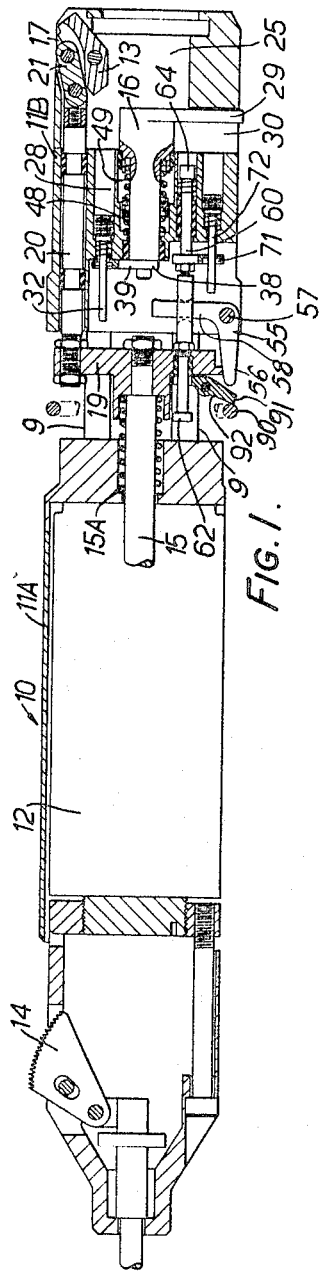
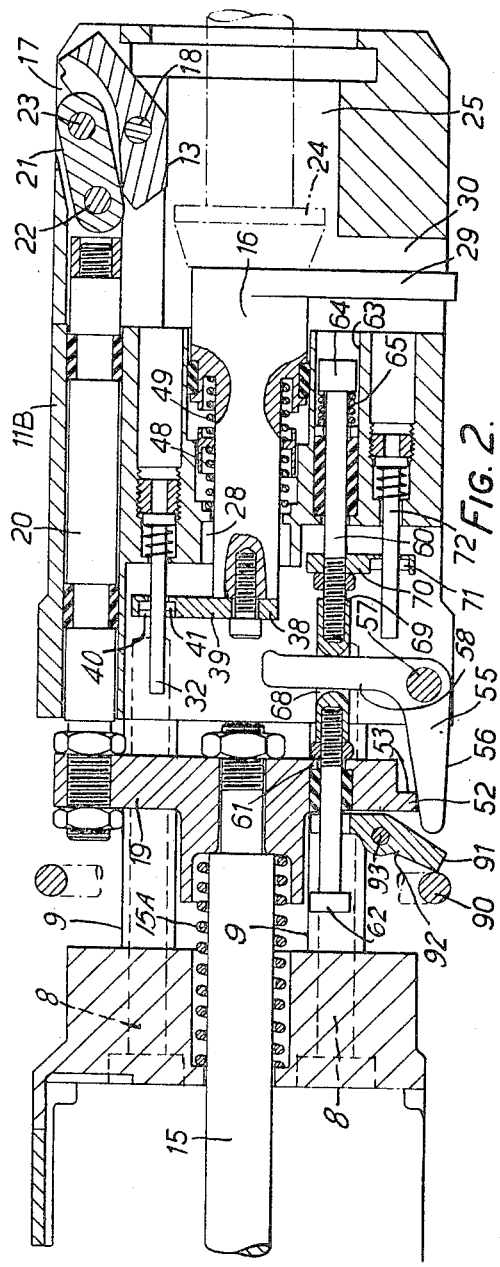
INVENTOR
JOHN E. STEPHENS
BY
Watson, Cole, Grindle + Watson
ATTORNEY

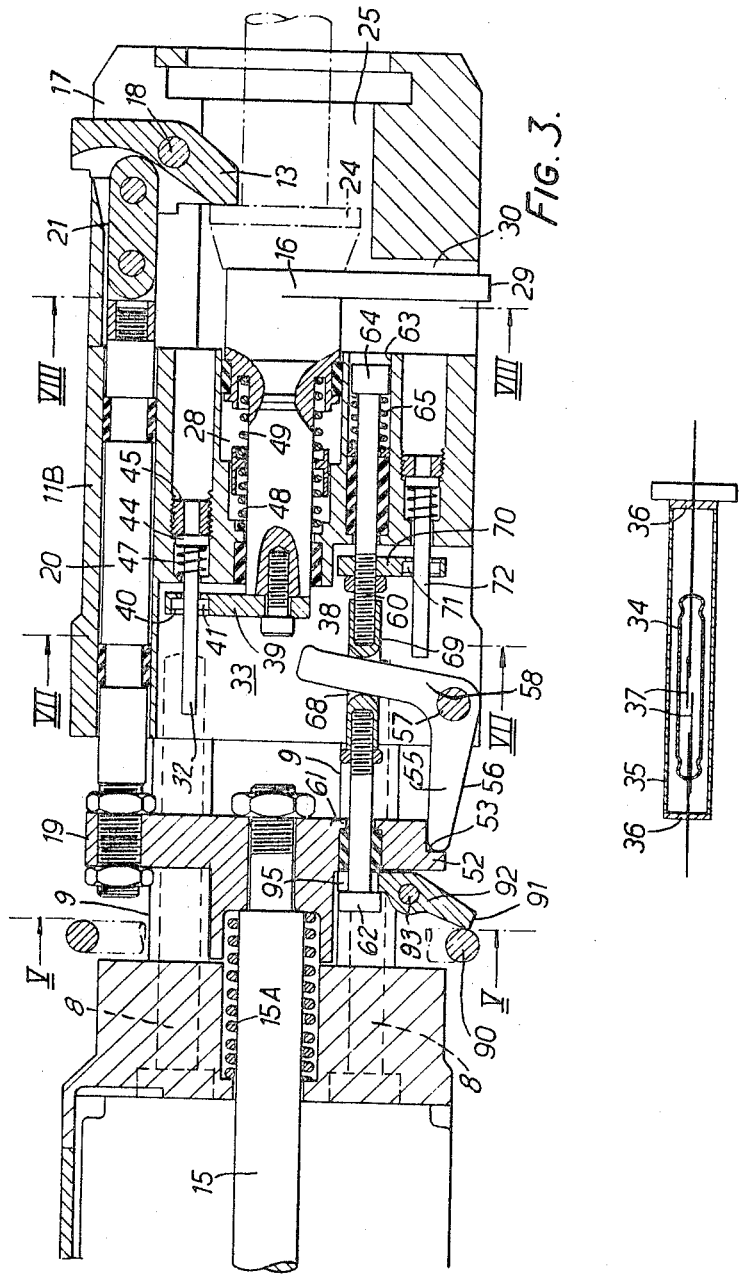

May 16, 1967   J. E. STEPHENS   3,319,992
GRABS
Filed Feb. 8, 1965   3 Sheets-Sheet 3

INVENTOR
JOHN E. STEPHENS
BY
Watson, Cole, Grindle & Watson
ATTORNEY

United States Patent Office 3,319,992
Patented May 16, 1967

3,319,992
GRABS
John Eskett Stephens, Heston, England, assignor to Fairey Engineering Limited, Heston, England, a company of Great Britain
Filed Feb. 8, 1965, Ser. No. 431,138
11 Claims. (Cl. 294—83)

This invention relates to grabs of a type adapted to be lowered into a fuel channel in the core of a nuclear reactor to grab the head of a fuel element stringer or other object therein for the purpose of hoisting it out of the core; and also to lower a suspended fuel element stringer or other object down into a fuel channel.

According to the present invention, a grab of the type specified is provided with a proximity sensing device constructed and arranged to produce a signal or other indication of the proximity of the end of the grab to an object to be grabbed thereby. For example the proximity sensor may comprise a feeler protruding at the lower end of the grab and arranged to operate an electric switch in an indicating circuit when engaged by an object located in a position in which it is capable of being grabbed by the jaws of the grab.

The grab can thus be employed under conditions of high temperature and/or high pressure such as would prevent the use of a television camera inside the reactor pressure vessel in the vicinity of the grab to monitor visually the operation of lowering the grab into engagement with an object in a fuel channel. The proximity sensing device will indicate to the grab operator the moment when the grab has been lowered into proximity with the unseen object to be grabbed, and when the grab is positioned at the correct level for actuation to secure the object.

According to another aspect of the invention the grab is provided with jaws which, when in their engaged positions, have inwardly-protruding jaw portions for grabbing engagement around the exterior of an object inserted between the jaws, and also have outwardly-protruding jaw portions for grabbing engagement within the interior of a surrounding hollow or recessed object into which the jaws have been inserted, for example a cylindrical debris can or tubular adaptor.

In one form of the invention the jaws of the grab are spring-biassed towards their released positions by means of spring means and the grab is provided with power-driven actuating means, for example a solenoid, which when actuated moves the jaws into their engaged positions, and with automatically-operating latch means arranged when engaged to latch the jaws in their engaged positions and prevent their being returned to their released positions by the spring means after the de-energisation of the actuating means.

In one such construction the proximity sensing device may also serve to release the latch means when required and allow the disengagement of the grab by the release spring means. For example the proximity sensing device may comprise a plunger guided for sliding movement in the grab body in the direction parallel to the longitudinal axis thereof, and arranged to be engaged and raised by an object onto which the grab is lowered, the plunger actuating an indicating switch when so raised to a predetermined position, referred to as the proximity level, in and relative to the grab body, and moreover the plunger may be arranged to engage and actuate a latch release member so as to allow the grab to be disengaged by the release spring means, when the plunger is raised to a predetermined level above its proximity level by a lowering movement of the grab still further down onto the object grabbed.

The invention may be carried into practice in various ways but one specific embodiment will now be described by way of example only with reference to the accompanying drawings, in which FIGURE 1 is a longitudinal sectional view of a grab for use in a nuclear reactor, FIGURES 2 and 3 are respectively sectional views of the lower part of the grab of FIGURE 1 but showing the parts thereof in different positions, FIGURE 4 is a diagrammatic detail view of one of the indicator switches incorporated in the grab of FIGURES 1 to 3.

Figure 5:
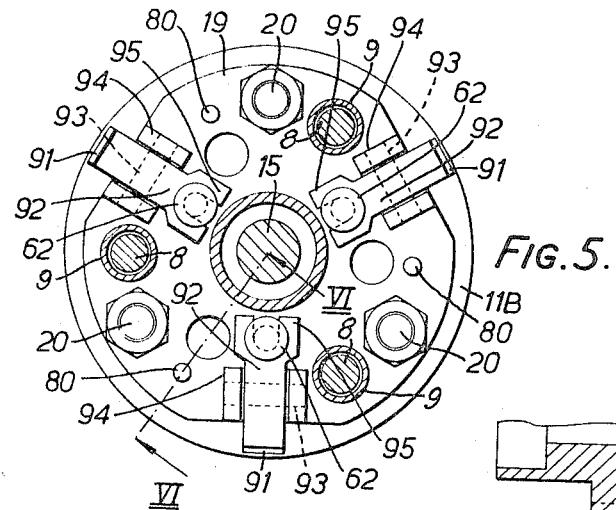
FIGURE 5 is a cross-section on the line V—V of FIGURE 3.

In the illustrated embodiment a solenoid-actuated grab 10 for use with the refuelling machine of a nuclear reactor comprises a canister-shaped grab body 11A, 11B in the upper end 11A of which is housed the actuating solenoid 12 for operating the grab jaws 13, which are located at the bottom of the lower part 11B of the body. The upper part 11A of the body also houses, above the solenoid, a spragging device 14 for spragging the grab 10 against the wall of a reactor standpipe, the close-fitting charging tube of the refuelling machine, or any other close-fitting cylindrical bore in which it is required to wedge the grab temporarily against accidentally falling down the bore, for example in the event of a failure of a suspension cable or of the hoist of the refuelling machine. The two body parts 11A and 11B, in order to function together as described, may be secured together by the three bolts 8 which are surrounded by spacer sleeves 9.

The solenoid plunger rod 15 extends centrally down the grab body into the lower part 11B which contains a proximity sensing device 16 and locking mechanism for the jaws 13. The solenoid plunger 15 is spring-loaded downwardly by a compression spring 15A, and is raised against the action of the spring when the solenoid 12 is energized. The three grab jaws 13 are distributed around the circumference of the grab body 11B just above the rim of its open lower end, each grab jaw 13 being double-ended and being pivoted in a recess 17 in the body 11B on a pin 18 at an intermediate point of its length about a pivotal axis which is normal to the radial direction and to the longitudinal axis of the grab. Each jaw 13 when turned to its disengaged position is housed substantially wholly within the thickness of the wall of the grab body 11B as shown in FIGURES 1 and 2, but can be turned through an angle of about 50° into its engaged position shown in FIGURE 3 in which the two operative end portions of the grab protrude respectively radially inwardly and radially outwardly from the inner or outer surface of the grab body 11B. The solenoid plunger rod 15 carries at its lower end a coaxial disc 19, to the marginal portion of which are bolted three circumferentially-spaced push rods 20 which extend slidably through tunnels formed in the side wall of the grab body 11B down into the three jaw recesses 17. The lower end of each push rod 20 is operatively connected by means of short pivoted links 21 and pivot pins 22, 23 to a point of the associated jaw 13 spaced radially from the pivotal axis of the jaw 13, the arrangement being that the solenoid spring normally holds the plunger 15 and the three push rods 20 in their downward position shown in FIGURES 1 and 2 in which the jaws 13 are turned by the push rods 20 to their disengaged positions in the recesses 17 within the wall thickness of the body 11B, but energization of the solenoid 12 overcomes the spring and raises its plunger 15 and the three push rods 20 to turn the three jaws 13 into their operative or engaged positions protruding inwardly and outwardly from the body wall 11B, as shown in FIGURE 3.

This arrangement enables the grab 10 to be employed both to grab inwardly so as to secure an object such as the head of a seal plug or fuel element stringer indicated in chain lines at 24 in FIGURES 2 and 3 and inserted between the jaws 13 into the open lower end 25 of the grab body 11B, and to grab outwardly so as to secure a recessed or tubular article, for example a debris can, a debris can lid, or a tubular adapter, into the open upper end of which the lower part 11B of the grab body including the jaws 13 have been lowered. The adapter referred to may be employed for picking up a fuel element pencil.

The proximity-sensing device 16 is in the form of a vertical sensing plunger slidably mounted in a guide passage 28 formed centrally in the lower part of the grab 11B below the lower end of the solenoid plunger 15, the sensing plunger 16 having three radially-outwardly-extending arms 29 at its lower end which project through correspondingly-located apertures 30 in the side wall of the grab body 11B just above the level of the jaws 13. The three arms 29 protrude outwardly beyond the outer surface of the grab body 11B, for engagement by the rim of a tubular debris can or like object into whose open upper end the grab is lowered. The under surface of the central portion of the sensing plunger will be engaged by the head 24 of a fuel stringer or like object onto which the grab 10 is lowered. The lifting of the sensing plunger 16 relatively to the descending grab body 11B as the plunger 16 or its arms 29 engage and rest on the object to be grabbed, is caused to actuate a set of three switches 32 in an indicating circuit at the precise moment when the grab 10 has reached the proximity level referred to above, such that its jaws 13 when moved to their operative positions are capable of grabbing that object by engaging beneath a radially-protruding abutment or like surface thereof. This indicates to the operator that the lowering of the grab 10 should be stopped and that the solenoid 12 can be operated to actuate the jaws 13 and grab the object.

The proximity indicating switches 32 referred to are illustrated in detail in FIGURE 4 and are magnetically-operated switches of elongated form mounted vertically in offset positions distributed around a central recess 33 in the grab body below the bottom of the solenoid plunger. Each switch 32 comprises a glass tube 34 clad in a metal sheath 35 closed by insulating end caps 36, the glass tube 34 containing a pair of cooperating trembler contacts 37 which are magnetically-responsive and which close to complete an indicating circuit when subjected to a strong magnetic field. The upper end of the proximity-sensing plunger 16 projects into the central recess 33 and carries a spider 38 having three radially-extending arms 39 each formed with a circular aperture near its outer end through which one of the tubular switches 32 extends. Each spider arm 39 is also formed with an annular recess 40 in its upper surface around the aperture and around the tubular switch 32 extending through it, and a small annular or semi-annular permanent magnet 41 is housed in the recess 40 so that its opposite magnetic poles are located on diametrically-opposite sides of the switch 32. As the proximity-sensing plunger 16 rises and falls in the grab body 11B it moves the spider 38, and with it the three magnets 41, up and down the associated elongated switches 32. In most positions of each magnet 41 relatively to the associated switch 32 the magnet is not operative on the switch contacts 37 and the switch remains open. In one particular relative position of the magnet 41, however, the magnetic field will act on the switch contacts 37 to close them and so complete the associated indicating circuit to send a signal to the grab operator. Each switch is provided with a flange 44 at one end which is housed in a screw-threaded recess 45 in the grab body. A compression spring 47 mounted in the recess 45 acts on the flange 44 in opposition to a screw-threaded securing plug which is screwed into the recess 45 to trap the flanged end of the switch. Thus the spring 47 holds the flanged end of the switch pressed against the securing plug, and the vertical level of the switch in the grab body 11B can be adjusted by screwing the plug 47 up or down in the recess 45. In use the positions of the three switches 32 are so adjusted that their associated magnets 41 reach the operative position in which they close the three switches 32 at the instant when the proximity sensing plunger 16 reaches its aforesaid proximity level. The proximity sensing plunger 16 is enclosed by a pair of axially superimposed light helical compression springs 48, 49 which urge it lightly towards its lowermost position in the grab body 11B.

The grab 10 is also provided with an automatically-operating latch mechanism which serves to lock the jaws 13 of the grab in their protruding operative positions, referred to as their engaged positions and shown in FIGURE 3, after the energization of the solenoid 12, and prevents the release of the grab by the action of the solenoid spring. Thus the disc 19 carried by the solenoid plunger 15 is formed with an external radially-outwardly-protruding flange 52 around the upper part of its circumferential edge, which defines a step or recess 53 beneath the flange which is used as a latching abutment surface. Three pivoted latch levers 55 of bell-crank form co-operate with the abutment surface 53. Each lever 55 has one arm 56 extending generally upwardly from its pivot 57 so that its tip can engage the horizontal latching abutment surface 53 beneath the flange 52, entering into the stepped recess beneath the flange, so as to lock the disc 19 and the solenoid plunger 15 in its raised position in which the jaws 13 of the grab 10 are in their engaged positions, as shown in FIGURE 3. The other arm 58 of each lever 55 extends generally radially-inwardly into the central recess 33. When the three levers 55 are tilted so that their latching arms 56 move radially outwardly outside the edge of the disc of the disc flange 52, the latch is released and the disc 19 can descend, allowing the solenoid spring to move the grab jaws 13 to their released positions as shown in FIGURES 1 and 2. To operate the three bell-crank latch levers 55, three spring-loaded latch plungers 60 are provided, each of which extends between the solenoid plunger disc 19 and into the body 11B of the grab below the central recess 33. The upper part of each latch plunger 60 passes through a close-fitting hole 61 in the disc 19 and is formed at its extreme upper end with an enlarged head 62 which prevents its withdrawal downwardly through the disc hole 61. The lower part of each latch plunger enters a cylindrical chamber 63 formed in the body 11B of the grab and is formed at its extreme lower end with an enlarged piston 64 which is a loose sliding fit in the cylindrical chamber 63. Each latch plunger 60 is an easy sliding fit in the grab body and is spring-urged in the downward direction by means of a helical compression spring 65 which surrounds its lower part in the cylindrical chamber and acts downwardly against its piston head 64. The radially-inwardly extending arm 58 of each bell-crank latch lever 55 passes transversely through a close-fitting aperture 68 formed in a screw-threaded vertically-adjustable sleeve 69 constituting the intermediate portion of the length of the associated latch plunger 60. Thus the vertical movement of each latch plunger 60 acts on the trapped arm 58 of the associated bell-crank lever 55 and has the effect of turning the lever 55 in the corresponding direction about its pivot 57, thus operating the latch mechanism. Furthermore the arm 58 of each bell-crank lever 55 projects radially inwardly beyond its associated latch plunger 60 to a position such that its extreme inner end overlies the spider 38 of the proximity sensing plunger 16 and can be engaged and lifted thereby when the proximity-sensing plunger 16 is raised above its said proximity level. As will be described later, this enables the latch to be released by means of the proximity-sensing plunger 16.

Each latch plunger 60 also carries an outwardly-extending transverse bar 70 which carries an annual or half-annular permanent magnet 71 and co-operates with a further magnetically-operated trembler switch 72 similar to the switch 32 previously described. The switch 72 is adjustably mounted on the grab body 11B by a means similar to that of the switch 32, and extends vertically in the central recess 33 and passes through an aperture in the outer end of the bar 70, the arrangement being such that the three switches 72 will be closed by the magnets 71 to produce an indicating signal when the three latch plungers 60 are moved into positions shown in FIGURE 3 such that their latch levers 55 are locked beneath the flange 52 of the solenoid plunger disc 19 and the grab jaws 13 are locked in their engaged positions.

Figure 6:
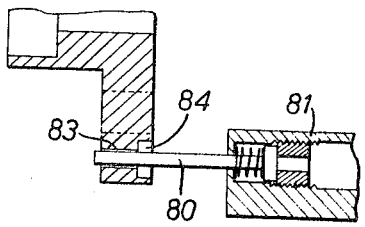
FIGURE 6 is a fragmentary view in longitudinal section on the line VI—VI of FIGURE 5, and FIGURES 7 and 8 are respectively cross-sections on the lines VII—VII and VIII—VIII of FIGURE 3.
Figure 7:
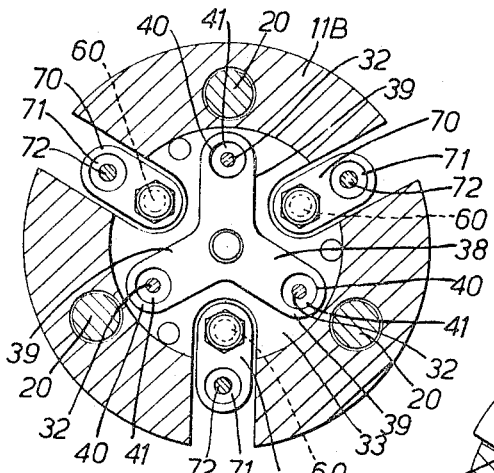
Figure 8:
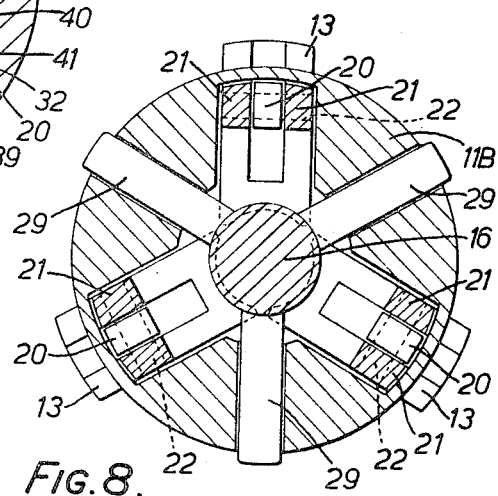

The solenoid plunger disc 19 is also provided with indicating switch means for indicating its position relative to the grab body 11B. Thus as shown in FIGURE 6, three further elongated magnetically-operated trembler switches 80 similar to the switches 32 and 72 previously described are mounted vertically on bosses 81 of the grab body in circumferentially-spaced locations, and each switch 80 extends through a close-fitting aperture 83 in the disc 19 provided with an operating magnet 84 as described above.

The operation of the grab 10 is as follows. Assume that the solenoid is de-energized and the latch 52, 55 is released, so that the solenoid plunger disc 19 is in its lowered position and the grab jaws 13 are in their released positions as indicated in FIGURE 1. The upper arms 56 of the three latch levers 55 lie outside and in contact with the edge of the disc flange 52. Each latch plunger 60 is held by its associated latch lever 55 in a raised position in which its upper head 62 is spaced above the upper face of the disc 19.

If now the grab 10 is lowered onto the head 24 of a fuel stringer until the lowered proximity-sensing plunger 16 engages the head 24, further lowering of the grab to the position of FIGURE 2 will lift the plunger 16 in the body 11B until the three proximity switches 32 are closed by the magnets 41 of the plunger spider 38, thus giving the grab operator a signal indicating that the grab 10 has reached a position in which it is capable of securing the stringer head 24. The operator now stops lowering the grab, and energizes the solenoid 12. The solenoid plunger 15 lifts the three push rods 20 to move the jaws 13 into their engaged positions, and as the solenoid plunger disc 19 rises above the tips of the upper arms 56 of the latch levers 55, these will snap radially inwardly under the force of the springs 65 acting downwardly on their associated latch plungers 60, into latching engagement beneath the flange 52 of the disc 19, the tips of the three lever arms 56 entering the stepped recess 53 beneath the flange 52, so that the solenoid plunger 15 is positively locked against downward movement in the position shown in FIGURE 3 with the grab jaws 13 in their engaged position. The solenoid 12 is now de-energized, but the engagement of the arms 56 of the three latch levers 55 beneath the disc 19 will continue to hold the grab jaws 13 positively locked in their engaged positions. Furthermore the latch indicator switches 72 associated with the latch plungers 60 will all be closed and will provide the grab operator with a signal indicating that the grab jaws 13 are safely locked. The grab 10 can now be hoisted to raise the grabbed stringer or other object.

When it is required to disengage the grab 10 it is necessary to release the latch 52, 55. This is done by lowering the suspended stringer or other object onto a supporting surface and then lowering the grab 10 still further down onto the supported stringer. This will cause the proximity sensing plunger 16 to be raised further above its "proximity level" by the stringer head 24 until its spider 38 engages and lifts the tips of the inwardly-projecting lower arms 58 of the bell-crank latch levers 55, thus tilting the three latch levers 55 outwardly until their arms 56 are clear of the disc flange 52 and the latch is released, allowing the solenoid plunger 15 to descend under the action of its biasing spring 15A to move the grab jaws 13 to their released positions. The grab 10 can now be lifted off the released stringer head 24 or other object.

The grab 10 is also provided with an emergency jaw release mechanism which can be operated to release the latch 52, 55 in the event of the proximity sensing plunger 16 being unable to operate or of its jamming. This emergency release mechanism comprises a release ring 90 which surrounds the grab body and can be pushed downwardly onto the outwardly-protruding arms 91 of three radially-extending release levers 92. Each release lever 92 is pivoted by a pin 93 at an intermediate point of its length to a bracket 94 on the upper face of the solenoid plunger disc 19 and is formed at its inner end with a fork 95 which closely surrounds the stem of one of the three latch plungers 60 beneath its upper head 62. When the outer ends 91 of the release levers 92 are depressed by the release ring 90, their forked inner ends 95 are raised to lift the three latch plungers 60, and so to turn the bell-crank latch levers 55 outwardly so as to release the lever arms 56 from beneath the flange 52 and allow the grab jaws 13 to be disengaged by the downward movement of the plunger 15 and push rods 20. The extinction of the signals from the three latch indicating switches 72 indicates to the operator that the emergency release mechanism has operated correctly to release the latch 52, 55, whilst the signal from the solenoid position indicating switches 80 shows that the plunger 15 has moved down to open the jaws 13. The emergency release ring 90 is adapted to be depressed by means of the motor-driven pawl release mechanism built into the bridging tube of the refueling machine.

What I claim as my invention and desire to secure by Letters Patent is:

1. A grab for grabbing an object in a restricted passage, which comprises a grab body, grab jaws movable between engaged and released positions, power-actuated operating means coupled to the jaws and operable to move them between their engaged and released positions, and a proximity sensing device mounted on the grab body and arranged to operate an indicator device to produce a signal or other indication of the proximity of the grab body to an object to be grabbed.

2. A grab as claimed in claim 1 in which the proximity sensing device comprises a feeler protruding at the lower end of the grab, the feeler being operatively connected to an electric switch in an indicating circuit to actuate the switch when engaged by an object located in a position in which the object is capable of being grabbed by jaws of the grab.

3. A grab as claimed in claim 1 having jaws which, when in their engaged position, have inwardly-protruding jaw portions for grabbing engagement around the exterior of an object inserted between the jaws, and also having outwardly-protruding jaw portions for grabbing engagement within the interior of a surrounding hollow or recessed object into which the jaws have been inserted.

4. A grab as claimed in claim 1 in which the power-actuated operating means when energized moves the jaws into their engaged positions, and which includes release spring means acting on the grab jaws to spring-bias them towards their released positions and automatically-operating latch means operable to latch the jaws in their engaged position and prevent their being returned to their release position by the spring means.

5. A grab as claimed in claim 4 in which the proximity sensing device also automatically releases the latch means to allow the disengagement of the grab jaws.

6. A grab as claimed in claim 5 in which the proximity sensing device comprises a plunger guided for sliding movement in the grab body in the direction parallel to the longitudinal axis thereof, and arranged to engage and be raised in and relatively to the grab body by an object onto which the grab is lowered, and an indicating switch mounted in the grab body to be actuated by the proximity sensing plunger when the latter reaches a predetermined level, referred to as the proximity level, in and relative to the grab body.

7. A grab as claimed in claim 6 in which the proximity sensing plunger, when raised to a predetermined level above the proximity level in and relative to the grab body by a lowering of the grab body still further onto the object being grabbed, is arranged to engage and actuate a latch release means so as to release the latch and cause the grab jaws to be automatically disengaged from the object grabbed by the action of the release spring means.

8. A grab as claimed in claim 7 in which the power-actuated operating means comprises an actuating plunger connected to the jaws by connecting linkages, the actuating plunger being movable parallel to the axis of the grab between an engaged and a released position to move the jaws between their engaged and released positions respectively, and in which the latch means comprises a bellcrank lever pivoted to the grab body and having a generally axially extending latching arm and a generally radially inwardly extending release arm, the bellcrank lever being pivotally movable between a latching position in which the outer end of the axial latching arm engages behind an abutment on the actuating plunger to hold it in its engaged position thereby latching the jaws in their engaged positions against the force of the release spring means, and an unlatched position in which the axial latching arm is clear of the abutment on the actuating plunger, and in which the proximity sensing plunger engages the radial latch release arm to turn the lever to its unlatched position and release the latch when the proximity sensing plunger is raised to the said predetermined level above the proximity level in relation to the grab body.

9. A grab as claimed in claim 8 which includes a yoke slidably mounted in the grab body and engaged around the latch release arm so as to follow the pivotal movement of the latch lever in each direction the yoke being arranged to operate a second indicating switch when the bellcrank lever is turned into its latched position.

10. A grab as claimed in claim 9 which includes yoke spring means acting on the yoke to bias the bellcrank lever towards its latched position.

11. A grab as claimed in claim 10 which includes emergency release means operable to move the yoke against the force of the yoke spring means to cause the yoke to turn the bellcrank lever to its latch released position.

References Cited by the Examiner

UNITED STATES PATENTS

| 3,039,811 | 6/1962 | Bradley et al. | 294—83 |
| 3,064,855 | 11/1962 | Fischer | 294—97 X |
| 3,095,102 | 6/1963 | Nadler | 294—90 X |
| 3,107,209 | 10/1963 | Frisch | 294—95 X |

FOREIGN PATENTS

| 1,190,100 | 3/1959 | France. |

M. HENSON WOOD, JR., *Primary Examiner.*

C. H. SPADERNA, J. N. ERLICH, *Assistant Examiners.*